United States Patent Office 3,721,910
Patented Mar. 20, 1973

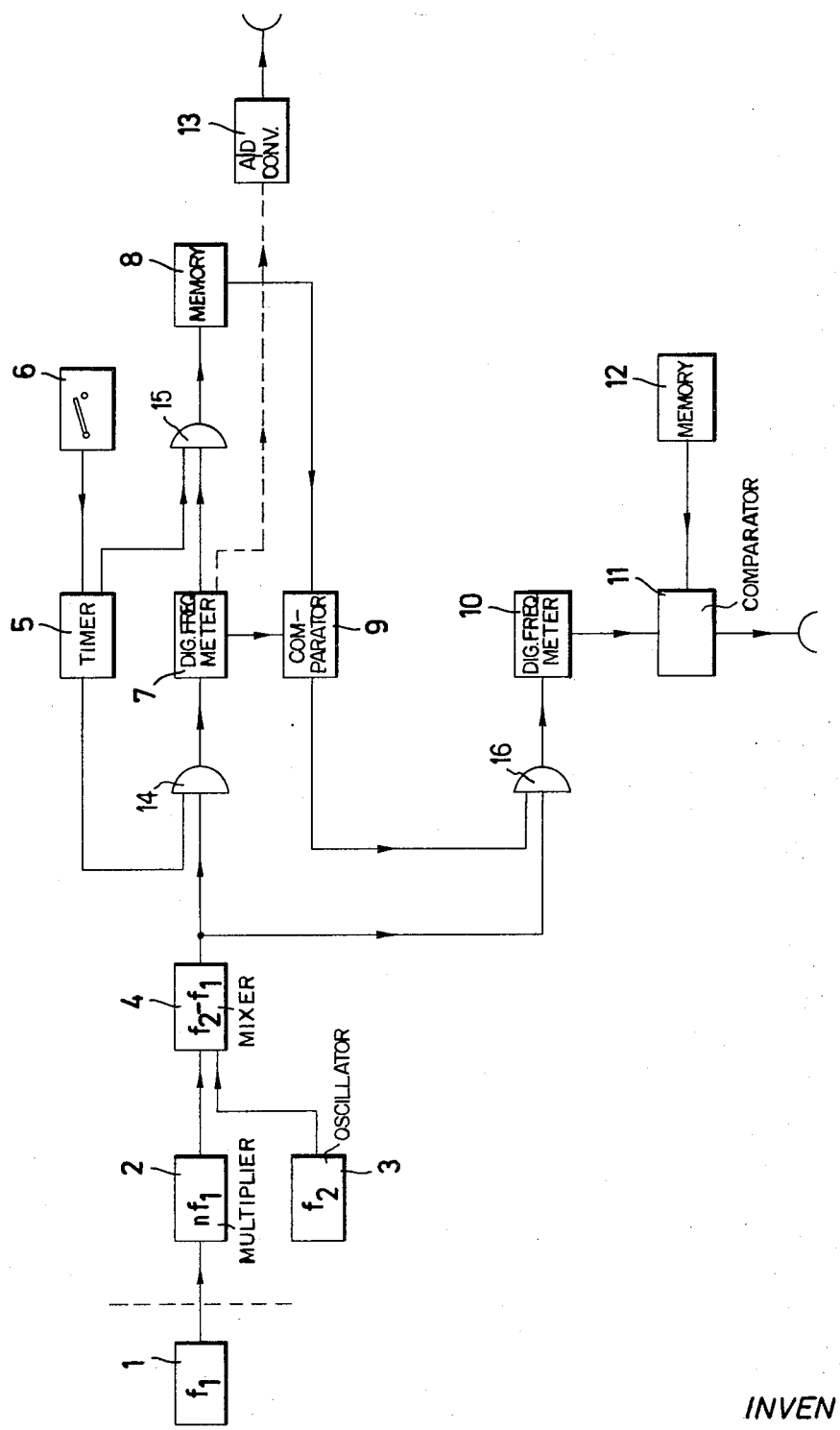

3,721,910
PROCESS MONITORING AND CONTROL
ARRANGEMENT
Ingo Wilmanns, Bruhl, and Alfred Barz, Lohmar, Germany, assignors to Leybold-Heraeus-Verwaltung GmbH, Cologne-Bayental, Germany
Filed Mar. 31, 1971, Ser. No. 129,816
Claims priority, application Germany, Apr. 3, 1970, P 20 15 957.3
Int. Cl. H03b 3/04
U.S. Cl. 328—141                                   8 Claims

ABSTRACT OF THE DISCLOSURE

A switching operation in a physical process is controlled by monitoring an actual value parameter of the process which is present in the form of a variable frequency signal. The frequency of the variable frequency signal is periodically measured within given measuring periods by means of a digital frequency meter and the value measured during the initial measuring period is compared with each of the values measured during the subsequent measuring periods. Whenever the difference between the two compared values reaches a predetermined value a control signal is initiated which may be utilized to control the switching operation of the process. According to a preferred embodiment of the invention the control signal is initiated whenever the subsequently measured value is at least equal to the initially stored value and is utilized to gate the variable frequency signal representative of the actual value parameter to a further digital frequency meter. The measured output value of this further digital frequency meter is then compared with a given fixed reference value to initiate a control signal for the switching operation of the process whenever the measured value is equal to or exceeds the fixed value.

BACKGROUND OF THE INVENTION

The present invention relates to a method and apparatus for monitoring and controlling processes in which an actual-value parameter of the process, which is represented as a variable frequency signal, is utilized to control a switching operation in or for the process.

In a great many technical processes for performing physical and/or chemical procedures, the operation of the process is controlled in dependence on the characteristic parameter values thereof. For example, in a freeze-drying process, the operation may be controlled according to the total pressure with the attainment of a certain pressure value indicating the end of the drying process. Most of the parameters characteristic for the process can either be converted to variable frequency signals representative of the respective parameters, or already are present as frequency changes, for example in electrical circuits.

It is already known in the process control art to convert such variable frequency signals into analog signals and to utilize the thus formed analog signals together with adjustable threshold value switches to control switching operations in the process, e.g. switching off or termination of the process. The accuracy and speed of response of such systems are limited, however, by the conversion of the variable frequency signal to an analog signal.

SUMMARY OF THE INVENTION

It is therefore the primary object of the present invention to provide a method and apparatus for monitoring and controlling processes in which an actual-value parameter appearing as a variable frequency is utilized to control a switching operation in the process, wherein the measuring accuracy of the control is increased as compared with known methods. The above obejct of the present invention is basically achieved in that the variable frequency representing the actual value parameter of the process is measured with the aid of a digital frequency meter within a plurality of given measuring periods, that the value representing the frequency measured during the first measuring period is stored and compared with the measured frequency values measured during the subsequent measuring periods, and that finally a switching signal is formed for controlling the associated switching operation when the difference between the stored value of the frequency measured during the first measuring interval or period and the frequency value measured during a later measuring interval exceeds a given value. Since the determination of the frequency is accomplished by means of a digital frequency meter, the measuring accuracy can be substantially increased since it then depends only on the duration of the measuring period. The duration of the measuring period is normally so selected that the change in the parameter to be controlled does not exceed a given maximum value during the measuring period or interval.

According to a further feature of the present invention it is advisable to employ a higher harmonic of the frequencies to be measured during the actual performance of the digital frequency measurement. In this manner the absolute frequency change is increased corresponding to the degree of the harmonic. This means that for a given measuring accuracy, the duration of the measuring period can be shortened in the same ratio.

It is further advantageous according to a further feature of the invention to mix the variable frequency or one of its harmonics with a fixed reference frequency and to use the thus formed difference frequency for the digital measurement. By mixing the variable frequency with a fixed reference frequency in this manner, the difference frequency representing the parameter has a lower frequency so that digital frequency meters with lower limit frequency can be employed.

According to still a further feature of the present invention the variable output frequency appearing during the first measuring period is measured with a first digital frequency meter and the measured value stored in a first memory, a second digital frequency meter is thereafter enabled whenever during a subsequent measuring period, the counter of the first frequency meter exceeds the stored value corresponding to the output frequency during the initial measuring period, and that the switching operation serving as the control is actuated when the frequency value measured by the second frequency meter has attained or exceeded a given value which is stored, for example, in a second memory. The second digital frequency meter thus registers only the frequency change caused during the operation of the process being monitored whereas other interfering influences which caused a frequency change before the onset of the process remain unconsidered.

It may further be advisable, according to a further feature of the invention, in addition to controlling the switching operation by digital frequency measuring, to perform a digital-analog conversion of the measured frequency values and to utilize the thus resulting frequency-proportional analog signals to execute further control procedures during the course of the process. Such an analog signal may control, for example, the speed at which the process takes place.

BRIEF DESCRIPTION OF THE DRAWINGS

The figure is a block circuit diagram of a preferred embodiment of a variable frequency measuring and control system according to the invention.

DESCRIPTION OF THE PREFERRED EMBODIMENTS

The block circuit diagram contains known elements in the individual switching stages the combination of which results in the desired sequence of operation of the control system.

In the figure the variable frequency $f_1$ produced by acutal value parameters characteristic to the process is shown as originating in a variable frequency generator 1. Although this frequency signal $f_1$ may be directly measured to provide the desired control signal, preferably, as mentioned above, in order to shorten the duration of the measuring intervals and/or the frequency limits of the digital frequency measuring instruments, the output signal $f_1$ of generator 1 is fed to a multiplier stage 2 to produce a harmonic $nf_1$ and/or then to a mixer stage 4. To the mixer 4 is also fed a fixed reference frequency $f_2$ from the oscillator stage 3, whereby the output of mixer 4 is equal to the difference frequency between the two input frequencies. In any case, the output of generator 1, multiplier 2, or mixer 4, which constitutes the variable frequency signal to be measured, is fed to a digital frequency meter 7. To determine the duration of the measuring period or interval a timing circuit 5 is provided which is connected with one input of a logic gate 14, e.g. an AND gate, whose other input is connected to the output of mixer 4 and whose output is connected to the input of the digital frequency meter 7. The starting pulse for the timing circuit 5 is emitted by a switching unit 6 so as to cause the gate 14 to periodically pass the output of mixer 4 to the input of digital frequency meter 7 for a given period of time in order to make the desired frequency measurements. The timing circuit 5 is also provided with an output connected to one input of a further logic gate 15 whose other input is connected to the output of frequency meter 7 and whose output is connected to the input of a memory 8. The timing circuit 5 causes the gate 15 to be opened during the first measuring period of a process so that the frequency value measured during this initial interval may be permanently stored for the duration of the process run.

By means of a digital comparison circuit 9 having its inputs connected to the outputs of the frequency meter 7 and the memory 8, the frequency value determined by the digital frequency meter 7 during each subsequent measuring interval is compared with the value stored in the memory 8. The comparison circuit 9 provides an output signal, which may be utilized as the direct control signal for the switching operation of the process, whenever the difference between the compared signals reaches a predetermined value. Preferably, as illustrated, the comparison circuit 9 provides an output signal whenever the subsequently measured frequency value is at least equal to the value stored in memory 8 and this output signal is connected to control a still further logic gate 16 connected between the output of mixer 4 and the input of a further digital frequency meter 10. The output signal from comparator 9 thus connects the frequency meter 10 to determine the frequency value of the signal from mixer 4 representing the variable actual value control parameter only when it bears a predetermined relationship to the value measured during the first measuring interval, i.e., the value stored in memory 8. The output of the digital frequency meter 10 is fed to a further digital comparison circuit 11, wherein it is compared with a preselected fixed value stored in a preselection memory 12. The comparison circuit 11 provides an output signal whenever the value stored in memory 12 is equaled or exceeded. The output of this further comparison circuit 11 is then utilized as the switching signal which controls the process sequence or switching operation, for example, terminates a freeze-drying process.

Advantageously the output of the digital frequency meter 7 can also be connected with a digital-analog converter 13 which produces a frequency-proportional analog signal for controlling a further process variable, for example, the speed of a freeze-drying process.

It will be understood that the above description of the present invention is susceptible to various modifications, changes and adaptations, and the same are intended to be comprehended within the meaning and range of equivalents of the appended claims.

We claim:

1. Apparatus for monitoring a characteristic variable parameter of a process, which parameter is represented by a variable frequency signal, and for controlling a switching operation in the process in accordance with the frequency of the signal comprising in combination:
    a first digital frequency meter means for measuring the frequency of said variable frequency signal during a plurality of sequential measuring periods of the same duration;
    mixer means connected in the input signal path of said first digital frequency meter means, for mixing said variable frequency signal with a reference signal of a fixed frequency whereby the difference signal therebetween is used for the digital measurement;
    first storage means connected to the output of said first digital frequency meter means for storing the measured frequency value obtained during the first measuring period for the process;
    a first comparator means for comparing the value stored in said first memory means with the measured output values from said first digital frequency meter means during each of the subsequent measuring periods and providing a control signal for controlling the associated switching operation of the process whenever the difference between the two compared signals reaches a given value.

2. The apparatus of claim 1 including means connected in the input signal path of said first digital frequency meter means, for multiplying said variable frequency signal to form a higher harmonic thereof.

3. The apparatus of claim 1 further including a digital-to-analog converter connected to the output of said first digital frequency meter means, the output from said converter being connected to control a variable parameter of the process.

4. A method for monitoring and controlling a process in which a variable frequency signal representing a particular characteristic parameter of the process is utilized to control a switching operation with respect to the process comprising, in combination:
    digitally measuring the frequency of said variable frequency signal during a plurality of measuring periods of the same duration;
    storing the measured value obtained during the first measuring period;
    comparing the measured value obtained during said first measuring period with the measured values obtained during subsequent measuring periods to provide a first output signal whenever the measured value of a subsequent measuring period exceeds said stored value;
    comparing the measured value obtained during said subsequent measuring period with a fixed value whenever said first output signal is provided to provide a second output signal whenever said measured value obtained during said subsequent measuring interval is at least equal to said fixed value; and
    controlling said switching operation of the process with said second output signal.

5. The method of claim 4 including: multiplying said variable frequency signal to provide a higher harmonic thereof prior to measuring same.

6. The method of claim 4 including: mixing said variable signal with a reference signal of a fixed frequency prior to measuring same.

7. The method of claim 4 including the steps of:
converting the digital measured value of said variable frequency signal to an analog signal proportional thereto, and;
controlling a further parameter of said process with said analog signal.

8. Apparatus for monitoring a characteristic variable parameter of a process, which parameter is represented by a variable frequency signal, and for controlling a switching operation in the process in accordance with the frequency of the signal comprising in combination:
a first digital frequency meter means for measuring the frequency of said variable frequency signal during a plurality of sequential measuring periods of the same duration;
first storage means connected to the output of said first digital frequency meter means for storing the measured frequency value obtained during the first measuring period for the process;
a first comparator means for comparing the value stored in said first storage means with the measured output values from said first digital frequency meter means during each of the subsequent measuring periods and providing a control signal for controlling the associated switching operation of the process whenever the measured value obtained during a subsequent measuring period exceeds the value stored in said first storage means;
a second digital frequency meter means for measuring said variable frequency signal;
gating means responsive to said control signal for connecting said variable frequency signal to the input of said second frequency meter means;
second comparator means for comparing the measured output value of said second frequency meter means with a fixed predetermined value stored in a second memory and for providing an output signal which initiates said switching operation in the controlled process when the said measured output value of said second frequency meter means is at least equal to said fixed value.

References Cited

UNITED STATES PATENTS

| | | | |
|---|---|---|---|
| 3,137,818 | 6/1964 | Clupper | 328—37 X |
| 3,144,802 | 8/1964 | Faber et al. | 324—78 DX |
| 3,267,474 | 8/1966 | Greenlee et al. | 324—78 DX |
| 3,509,476 | 4/1970 | Roth | 328—141 X |

FOREIGN PATENTS

| | | | |
|---|---|---|---|
| 1,112,448 | 8/1968 | Great Britain | 324—78 D |

JOHN S. HEYMAN, Primary Examiner

U.S. Cl. X.R.

324—78 D; 328—130, 155